United States Patent
Monaghan et al.

(10) Patent No.: US 6,388,780 B1
(45) Date of Patent: May 14, 2002

(54) HOLOGRAM PRODUCTION TECHNIQUE

(75) Inventors: Brian J. Monaghan, Maple Glen; Anthony W. Heath, Lansdale, both of PA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/569,291

(22) Filed: May 11, 2000

(51) Int. Cl.[7] .................................................. G03H 1/04
(52) U.S. Cl. ............................. 359/35; 359/1; 359/22; 359/25; 219/121.68; 219/121.69
(58) Field of Search ............................... 359/1, 35, 22, 359/25; 283/86; 430/1; 219/121.68, 121.69

(56) References Cited

U.S. PATENT DOCUMENTS

| | | |
|---|---|---|
| 3,829,838 A | 8/1974 | Lewis et al. .............. 340/172.5 |
| 3,832,948 A | 9/1974 | Barker |
| 3,970,781 A | 7/1976 | Dalton et al. |
| 4,046,986 A | 9/1977 | Barker |
| 4,806,731 A | 2/1989 | Bragard et al. |
| 4,879,451 A | 11/1989 | Gart |
| 4,940,881 A | 7/1990 | Sheets |
| 4,959,275 A | 9/1990 | Iguchi et al. |
| 5,098,176 A | 3/1992 | Wolf ............................ 359/11 |
| 5,138,471 A | 8/1992 | McGrew ...................... 359/21 |
| 5,149,937 A | 9/1992 | Babel et al. |
| 5,198,636 A | 3/1993 | Suchan |
| 5,243,589 A | 9/1993 | Stuke et al. |
| 5,262,275 A | 11/1993 | Fan |
| 5,502,581 A | 3/1996 | Sudo et al. .................... 359/10 |
| 5,605,097 A | 2/1997 | Ruckl et al. |
| 5,633,105 A | 5/1997 | Jensen et al. |
| 5,698,351 A | 12/1997 | Fischer |
| 5,817,243 A | 10/1998 | Shaffer |
| 5,822,092 A | 10/1998 | Davis |
| 5,892,597 A * | 4/1999 | Iwata ............................ 359/1 |
| 5,948,289 A | 9/1999 | Noda et al. |
| 6,043,913 A * | 3/2000 | Lu ............................... 359/35 |

FOREIGN PATENT DOCUMENTS

| | | |
|---|---|---|
| EP | 0393709 | 4/1990 |
| EP | 0467601 | 7/1991 |
| EP | 0467601 A2 * | 1/1992 |
| GB | 2133574 | 9/1983 |
| GB | 2151066 | 12/1983 |
| GB | 2215078 | 2/1988 |
| GB | 2222696 | 7/1988 |
| GB | 2271648 | 10/1992 |
| GB | GB 2 335 288 A | 9/1999 |

OTHER PUBLICATIONS

Vainos et al. "Excimer laser use for microetching computer generated holographic structures", Appl. Opt. 35(32), pp. 6304–6319, Nov. 1996.*

A. Rhody and F. Ross, "Holography Marketplace", 7th Edition, pp. 35–38, 1998.*

Edited by Alan Rhody and Franz Ross, *Holography Marketplace*, Seventh Edition, 1998, pp. 34–39.

* cited by examiner

*Primary Examiner*—Darren Schuberg
*Assistant Examiner*—Leo Boutsikaris
(74) *Attorney, Agent, or Firm*—Cantor Colburn LLP

(57) ABSTRACT

Apparatus for producing dot matrix holograms through laser ablation utilizing only two two-axis, low-inertia beam deflectors to control the maximum holographic direction, and the holographic coloration of the individual pixels of the holograms, and the method of utilizing that apparatus.

38 Claims, 11 Drawing Sheets

HOLOGRAM PRODUCTION TECHNIQUE

BACKGROUND

The present invention relates to techniques for producing holograms, including both the apparatus for doing so and the method of utilizing that apparatus.

Various techniques for producing holograms are known. These generally involve creating interference patterns or gratings in a surface which, when viewed, give rise to holographic visual effects. The conventional way to make these interference patterns is to selectively expose to illumination regions of a photosensitive material (photo-resist) which becomes insoluble in these exposed regions. The unexposed regions are then dissolved away, leaving behind the desired pattern. This pattern can then be regarded as the final holographic image. More commonly, however, it is used as a "master" to mechanically impress an equivalent pattern into a separate surface which then provides the desired holographic effect. Various auxiliary operations are also commonly performed. For example, the master can be metalized to strengthen its surface before using it to make the separate mechanical impression or impressions. The final holographic surface can also be metalized to provide increased light reflectivity to the viewer. Also, the pattern of illumination exposure can be reversed, provided the photosensitive material is one which becomes soluble through exposure, rather than the reverse.

More recently, an additional feature has been added to these conventional techniques. This feature involves treating the overall holographic image as an aggregation of tiny, separate areas, called pixels. The illumination of the photosensitive material is then performed one pixel at a time until the whole image area has been covered in this manner. By illuminating each pixel with appropriately directed interfering light beams, the holographic properties of individual pixels are determined. In turn, this pixel-by pixel treatment has led to the use of computer programs to control both the interfering directionality of the illumination and the locations of the individual pixels. This enables the production of holograms which are more susceptible to design variations through adjustment of the computer programming so as to create pixel arrays with various holographic characteristics. Such a computerized technique is disclosed in U.S. Pat. No. 5,822,092.

The resulting hologram, which consists of an array of holographic pixels, or dots, is sometimes referred to as a "dot matrix" hologram.

Although this prior art technique has some desirable features, it is far from ideal in several respects. First and foremost, it still relies on the process of polymerization of the photosensitive material in creating the interference pattern, or grating at each pixel location. This is inherently time consuming and must, of course, be followed by separate processes for removing the unpolymerized portions of the material. Such removal typically involves so-called "wet chemistry", which is another drawback. In addition, the technique requires the illumination to dwell on each pixel long enough for the polymerization process to become effective. That is not necessary if the illumination is performed, as was previously done, over large areas, or even over the whole image area at the same time.

The relatively time-consuming nature of this prior technique tended to discourage the creation of large-area holograms, and also the use of the initially created hologram as the final end product. Rather, it encouraged converting the initial creation into a master, for use in reproduction in the same manner as in prior non-pixel techniques. Thus, any potential benefits of the computer-controlled pixel-by-pixel technique are to a large extent negated.

A major improvement over the technique described above is disclosed in prior U.S. patent application Ser. No. 09/021,281, filed Feb. 10, 1998, which is assigned to the assignee of the present invention and is incorporated herein by reference as if fully set forth. In essence, this improvement resides in discarding the use of photosensitive material, which must be illuminated to polymerize selected areas, in forming the desired interference patterns. Instead, a laser is used to ablate a workpiece so as to directly form each pixel of the desired overall holographic image. No exposure of photosensitive material is required and no post-exposure treatment is needed to produce the desired pattern.

However, even this improved technique of the prior application can be still further improved. The above-identified prior application teaches the use of an interferometer head, which splits the laser beam into at least two parts, and then uses a set of angled mirrors to reunite these parts at the surface of the workpiece on which the desired interference patterns are formed through ablation. The azimuthal orientations at which the two beam parts reach the workpiece surface determine the direction of viewing at which the strongest holographic effect is perceived. The included angle between the beam parts reaching the workpiece determines the perceived holographic coloration. In order to produce different effects at different pixel locations, the azimuthal orientation of the whole interferometer head relative to the workplace surface has had to be changed intermittently and so did the angular orientation of the individual mirrors which form part of this interferometer head. For example, if the viewing direction at which the strongest holographic effect from a given pixel is perceived (hereafter called the "maximum holographic direction") was to be changed by 90°, from one pixel to the next, then the whole interferometer also had to be reoriented in azimuth by 90°. It is desired to make such changes very rapidly so as to enable the rapid formation of different holographic effects at consecutive pixel locations. This rapidity is especially crucial in the production of large-area holograms by means of the pixel-by-pixel technique, since these require the formation of many individual pixels and therefore also potentially many changes in interferometer head orientation.

An interferometer head such as described above has substantial mass and inertia and is therefore difficult to reorient with the desired rapidity. Moreover, the mechanical movements which are involved require precise location control and stability. As a practical matter, this limits the acceleration and deceleration rates for any head movement. Thus, the rate of creation of the different pixels which, in the aggregate, constitute the overall holographic imagery, becomes limited by the speed of reorientation movement of the interferometer head and its constituents and therefore cannot exploit the capability of the ablating laser itself to perform this pixel creation at a much higher rate. Also, any vibration involved in these re-orientations can detract from the extremely high positional accuracy which is desired in order to yield "good" holographic imagery.

It is desirable to overcome one or more of these shortcomings.

SUMMARY

Briefly stated, the present invention uses a laser beam to ablate a workpiece at predetermined locations so as to form holographic interference patterns in that workpiece. The laser beam preferably originates from a pulsed laser operating typically in the ultraviolet region.

To create the desired interference patterns, the laser beam is split into halves. These halves are directed by optics so as to become reunited at the surface of the workpiece which is to be ablated to form each holographic pixel. They arrive at each such reuniting location from controllable azimuthal directions and with controllable included angles. Thus they produce pixels with controllable maximum holographic direction and controllable coloration.

In accordance with the present invention, the only optical components which are involved in providing this control of direction and coloration, and which do not remain stationary while that is being done, are two two-axis low-inertia beam deflectors, such as the electronically controllable mirrors of a pair of two-axis galvanometers.

These beam deflectors are computer controlled to produce the desired holographic effect at each pixel location.

The beam deflectors used in accordance with this invention have an inertia which is very low and may even be close to zero. Therefore, the holographic effects produced at different pixels can be changed much more rapidly than was possible with the prior art technique using high-inertia interferometer heads. Also, in the present invention, the danger of optics misalignment which existed in the prior art is greatly reduced.

For further details, reference is made to the description which follows, in light of the accompanying drawings wherein:

DESCRIPTION OF THE PREFERRED EMBODIMENTS

Figure 1:
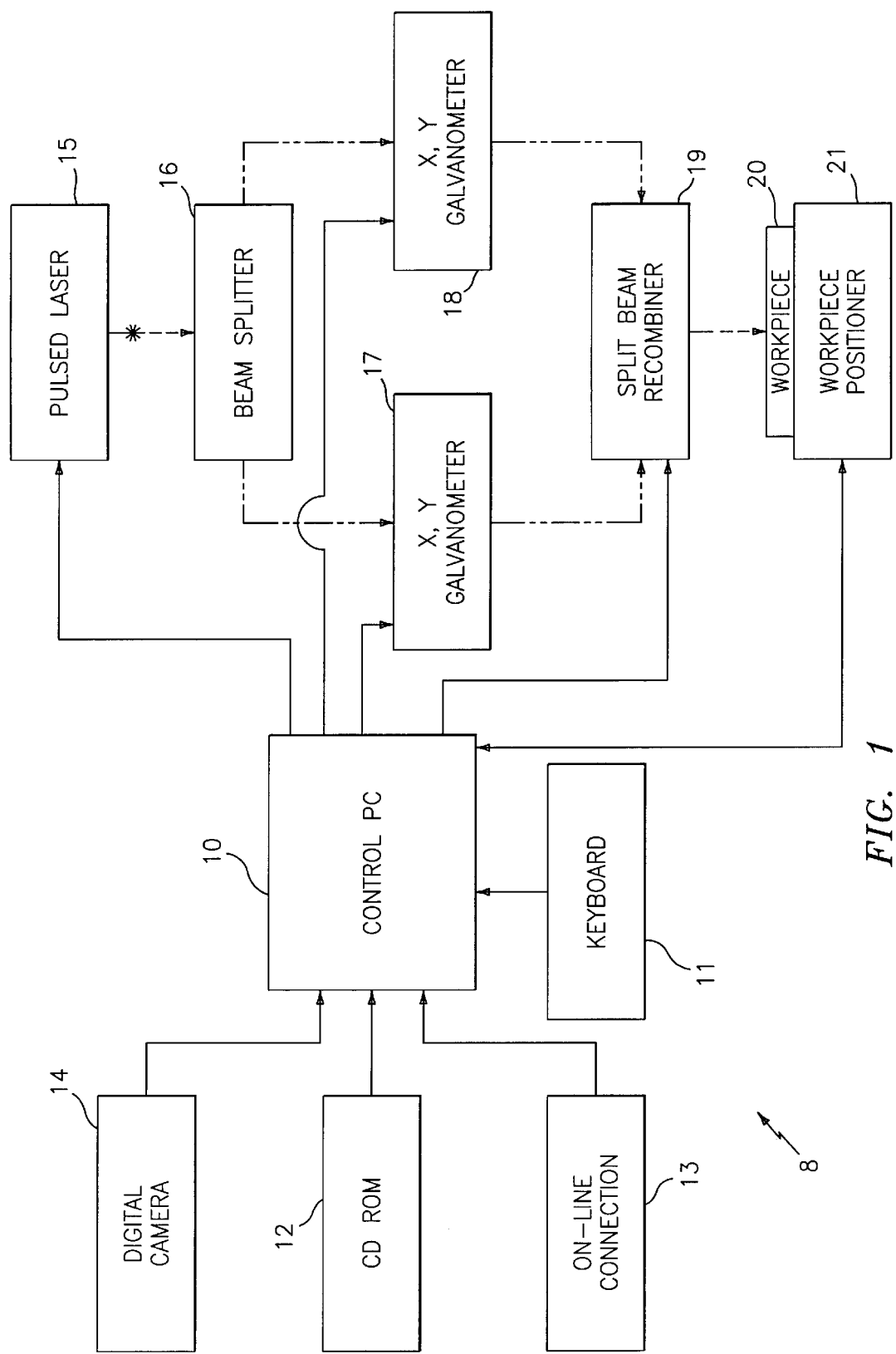
FIG. 1 is a simplified block diagram of an over all system embodying the present invention.

Certain terminology is used in the following description for convenience only and is not limiting. The words "right," "left," "lower", "upper", "vertical and "horizontal" designate directions in the drawings to which reference is being made and are intended only to aid in the description of the preferred embodiments. The terminology includes the words specifically noted above as well as derivatives thereof and words of similar import. Additionally, the words "a" and "one" are understood to mean one or more of the designated item unless specifically noted, and the term "only" is intended to be limiting with respect to the designated quantity or item referenced.

Referring to FIG. 1, the overall system 8 for producing holograms in accordance with the present invention includes a system controller, such as a PC 10, which is supplied with programming from at least one of several possible sources. These sources may include a keyboard 11, a CD-ROM 12, an on-line connection 13, and/or a digital electronic camera 14, or any others known to those skilled in the art. In response to such programming, the PC 10 supplies control signals to the controllable elements of the system of FIG. 1. The major elements of this system 8 include a pulsed laser 15, a beam splitter 16 for the beam from laser 15, a pair of two-axis galvanometers 17, 18, a split beam recombiner 19 and a workpiece 20 located on a workpiece positioner 21. Preferably, the laser 15 is a pulsed neodymium-yag laser, and the fourth harmonic of the basic frequency of such a neodymium-yag laser is utilized to ablate the surface of workpiece 20. However, it will be recognized by those skilled in the art from the present disclosure that other types of lasers may be used, depending on the type of surface to be ablated.

It is noted that some of the connections between elements in FIG. 1 are shown in solid lines, while others are shown in broken lines. The former represent electrical connections, and the latter represent a laser beam or laser beam halves traveling between elements. This same symbology is also used in the other figures of drawings.

Figure 2:
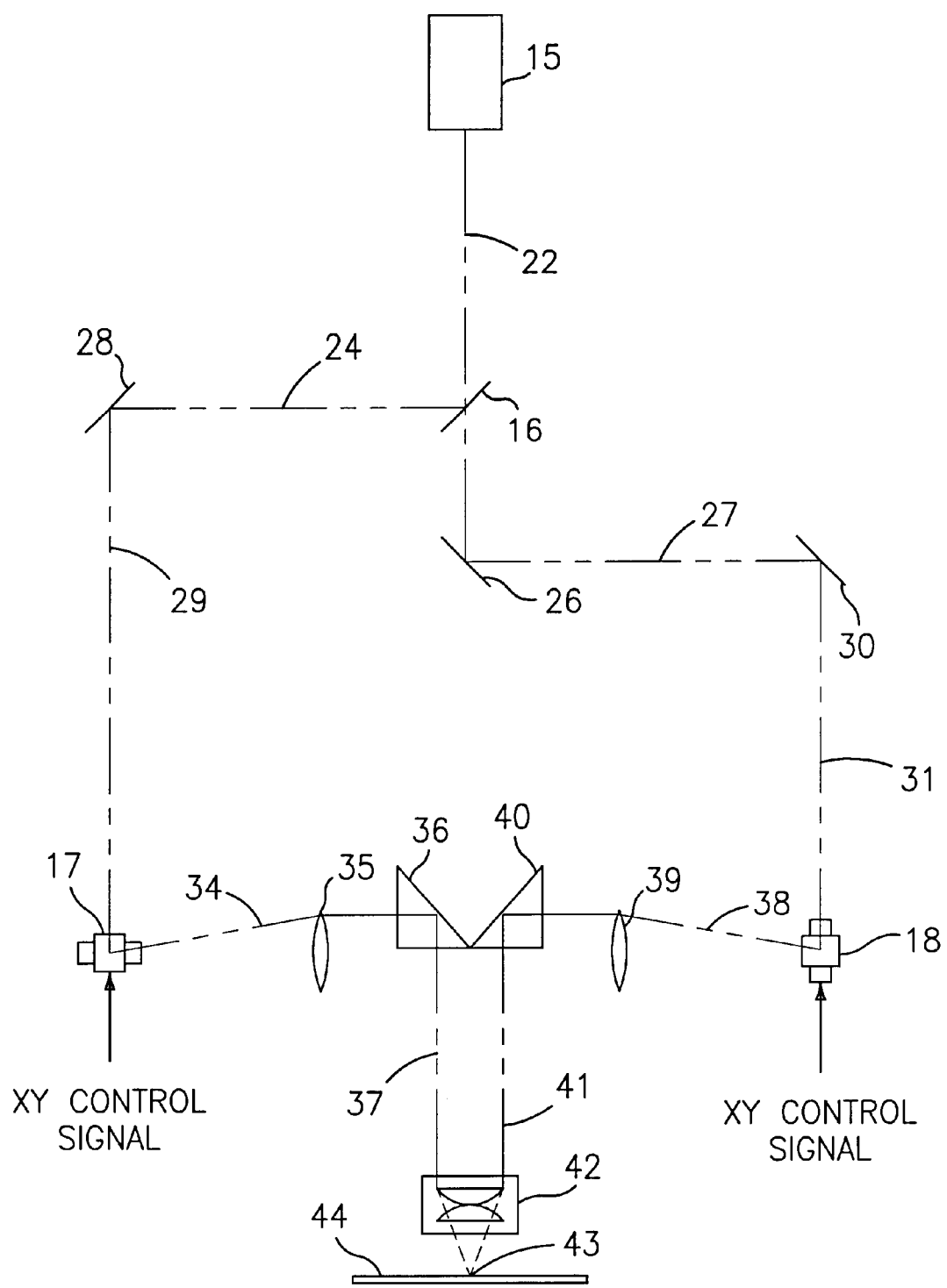
FIG. 2 is a diagrammatic elevation of an embodiment of the optics of the system of FIG. 1.

Turning now to FIG. 2, this shows an elevation of a currently preferred arrangement of the optics for the system 8 of FIG. 1. In FIG. 2, the beam 22 from the pulsed laser 15 is shown directed to the beam splitter 16, which may consist of a conventional dichroic beam splitter positioned so as to direct a first split half of the beam 22 toward the left along path 24 in FIG. 2, while permitting the second half of the beam 22 to continue on to a mirror 26. Mirror 26 then directs the second half beam toward the right along line 27 in FIG. 2. From the present disclosure it will be understood by those skilled in the art that the reference to a "split half of the beam" or "beam half" is not intended to indicate that the beam is precisely equally divided, but is intended only to identify the two split components of the beam. The magnitude or intensity relationship between the two beam halves can deviate from equality, the effect being a progressive dilution of the produced holographic effect.

The path 24 leads to a mirror 28, which directs the first beam half into a path 29, preferably at right angles to path 24. On the opposite side, path 27 leads to a mirror 30 which directs the second beam half into a path 31, preferably at right angles to path 27 and parallel to path 29. Path 29 leads to a first electronically controllable X, Y galvanometer 17 (see FIG. 1) while path 31 leads to a second electronically controllable X, Y galvanometer 18 (see FIG. 1). By "X, Y galvanometer" is meant a galvanometer whose mirrors are so constructed and positioned that they can be driven by appropriate electrical control signals, to controllably deflect an exiting beam of light in two mutually perpendicular directions. For convenient reference in the description which follows, these mutually perpendicular directions are designated herein as "X" and "Y" respectively (see also FIG. 3), and the galvanometers themselves are correspondingly designated in FIG. 1 as X, Y galvanometers 17, 18. Such currently preferred galvanometers are available under Model No. 6800 HP from Cambridge Technology of Cambridge, Mass. However, other suitable galvanometers may be utilized, if desired.

In the preferred embodiment, the paths of the beam halves 34 and 38 exiting from the X, Y galvanometers 17, 18 are generally perpendicular to their respective arrival paths 29, 31 and are directed oppositely to each other. In the embodiment of FIG. 2, the X, Y galvanometers 17, 18 are mounted with what might be called "complementary orientations." By this is meant the following. Assume that the two galvanometers are subjected to the same deflection control signals, in their respective X and Y directions. Their resultant exiting beams 34 and 38 will then be deflected in mirror-image fashion. This is evident in FIG. 2, where beam (half) 34 exiting from galvanometer 17 is shown deflected upwardly and beam (half) 38 exiting from galvanometer 18 is also shown deflected upwardly.

Since FIG. 2 is two-dimensional, deflections in the transverse directions cannot be illustrated in that figure. But it can be stated that such transverse deflections would also be in the same directions, either both into the plane of the paper, or both outward from that plane in FIG. 2. This is again due to the mounting of the galvanometers with the above-mentioned "complementary orientations".

Figure 9:
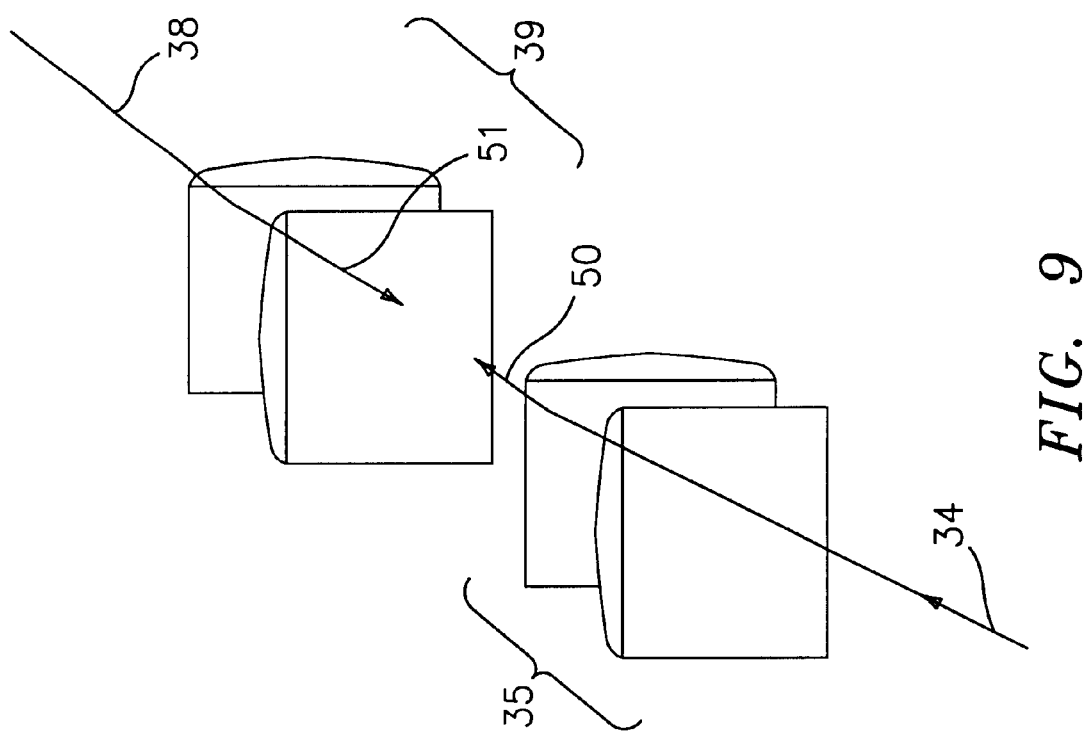
FIG. 9 is a perspective representation of a pair of collimating lens sets for collimating a pair of laser beams in an X,Y coordinate system.

Referring still to FIG. 2, the beam 34, as deflected by galvanometer 17, passes through a first collimating lens 35 to a first prism 36 where it is redirected into a path 37 at right angles to its arrival path from collimating lens 35. As best understood from FIG. 2, the collimating lens 35 may comprise a lens set such as a pair of cylindrical lenses oriented at right angles with respect to one another as shown in FIG. 9. The beam half 38, as deflected by galvanometer 18, passes through a second collimating lens 39 to a second prism 40 where it is redirected into a path 41, which parallels the redirected path 37 from the first prism 36. As best understood from FIG. 2, the collimating lens 39 may comprise a lens set such as a pair of cylindrical lenses oriented at right angles with respect to one another as shown in FIG. 9.

Paths 37 and 41 are directed toward a condensing lens system 42, (which corresponds to the recombiner 19 of FIG. 1) and may be comprised of one or more separate lenses directing the first and second beam halves from paths 37 and 41 to a common focal point 43. This focal point 43 constitutes the location of a pixel forming part of the hologram produced by the inventive technique. In FIG. 2, this is diagrammatically indicated by showing focal point 43 located on a surface 44, which corresponds to the surface of workpiece 20 (FIG. 1) on which the desired holographic imagery is formed, one pixel at a time.

Preferably, the beam splitter 16, the first, second and third mirrors 26, 28 and 30, the X, Y galvanometers 17, 18, the first and second collimating lenses 35 and 39 and the first and second prisms 36 and 40 are all mounted on a common support frame (not shown), in order to maintain accurately the positions of these optical components. These components may be fixed mounted or, preferably, mounted in adjustable holders so that the optical components can be initially aligned after first assembly. However, once these components have been aligned, they can then remain stationary, notwithstanding changes in the azimuthal directionality of the beam halves re-united at pixel location 43, or their included angle. These changes are all created by the deflection of beam halves 34 and 38, through electronic control of the X, Y galvanometers 17, 18.

Figure 3:
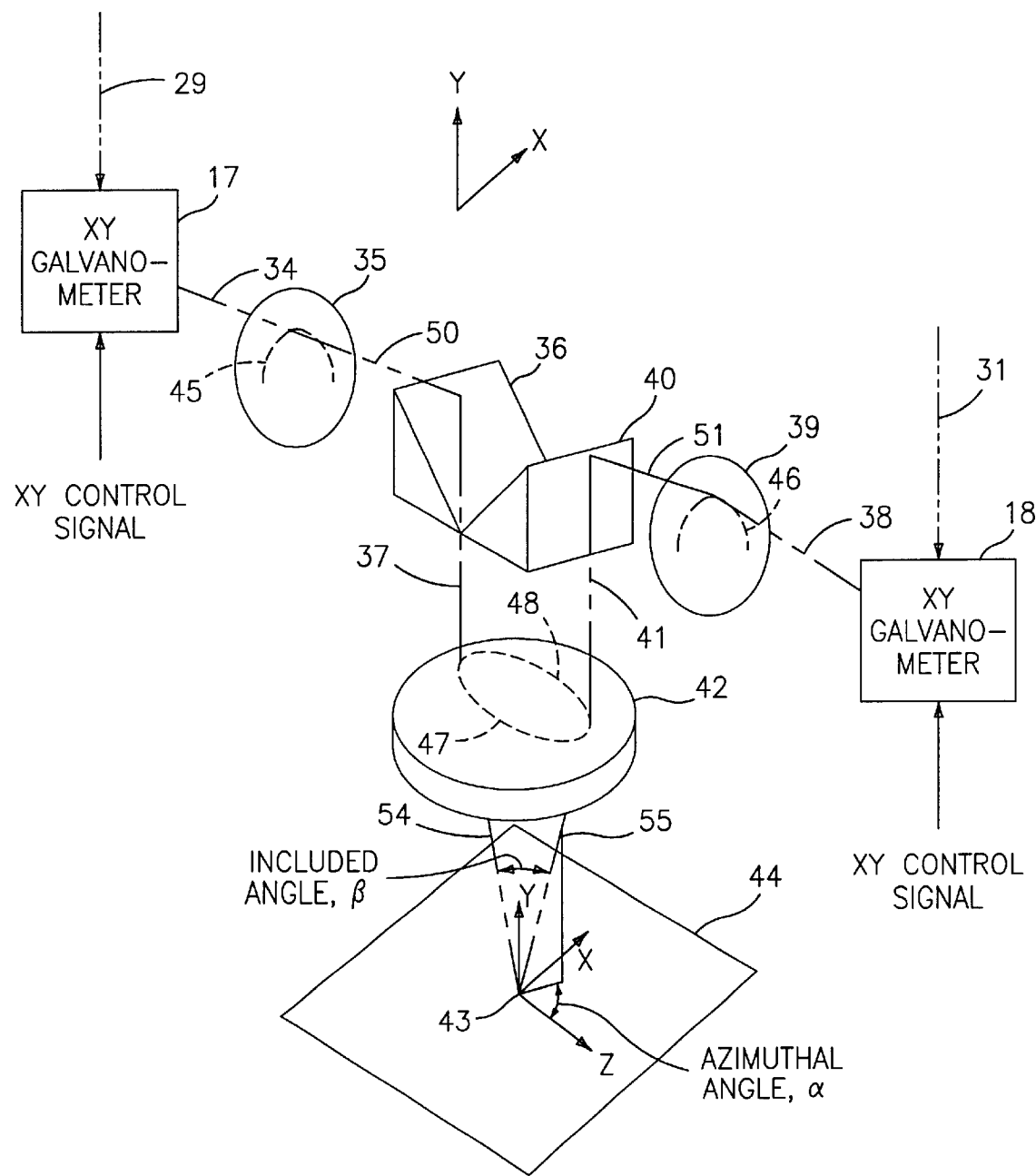
FIG. 3 is a partly isometric view of a portion of these optics, which diagrammatically illustrates how the laser beam halves are controlled to reach the workpiece at controllable azimuths and at controllable included angles.

FIG. 3, to which reference may now be had, illustrates more fully how the optical components of the invention cooperate to produce holographic pixels with controllable maximum viewing directions and colorations. In FIG. 3, there are shown some of the same optical components as in FIG. 2, namely collimating lenses 35 and 39, prisms 36 and 40, and condensing lens system 42, but drawn to a somewhat different scale and in a quasi-three dimensional (isometric) presentation.

In addition to the above, FIG. 3 shows a set of dotted-line semi-circles 45 through 48. Each of these semi-circles represents the potential virtual locus of one of the beams halves 34, 38, as deflected by the respective X, Y galvanometer 17, 18, during passage through one of the above-listed optical components.

More specifically, by applying appropriate electronic control signals to X, Y galvanometers 17, beam half 34 can be deflected so that it passes through collimating lens 35 at any desired point on locus 45. Beam half 38, on the other hand, can be correspondingly deflected so that it passes through collimating lens 39 at any desired point on locus 46. Because of the previously described complementary relationship between the two X, Y galvanometers, these points on loci 45 and 46 will be at mirror image locations, provided only that the electronic deflection control signals applied to both galvanometers are the same.

Each so-deflected beam half then continues toward the nearest prism (prism 36 for one continuing beam half and prism 40 for the other). These continuing beam halves are designated in FIG. 3 by reference numerals 50 and 51, respectively.

Due to the collimating nature of lenses 35 and 39, those continuing beam halves 50 and 51 maintain the same mirror image relationships as they had when passing through the collimating lenses 35, 39.

Each of the two prisms 36 and 40 functions to redirect by 90° the respective beam halves 50, 51. The resulting beam halves exiting these prisms are designated in FIG. 3 by reference numerals 37 and 41, respectively.

In arriving at condensing lens system 42, these redirected beam halves 37 and 41 can again be located at various points on semi-circular virtual locus 47 and 48, respectively, depending upon the deflections previously imparted to beam halves 34, 38 by X, Y galvanometers 17, 18 in response to applied electronic control signals.

However, semi-circular loci 45 and 46 are in parallel, laterally spread-apart planes and have their curvatures in the same direction. In contrast, semi-circular loci 47 and 48 are in a common plane and have their curvatures in opposite directions. In fact, by reasonably careful implementation and adjustment of the optical components discussed so far, these semi-circular loci 47 and 48 can be positioned close enough to each other so that they resemble the two halves of a complete circle.

Assuming again that the same control signals are applied to X, Y galvanometers 17, 18, it can be shown that beam halves 37, 41 will arrive at condensing lens system 42 at diametrically opposite locations on the two loci 47 and 48. Moreover, this diametrically opposite relationship will persist, even if the control signals for galvanometers 17, 18 are changed so that azimuthal locations of beam halves 37 and 41 are displaced along their respective loci 47, 48, provided that these changes are also equal.

Beam halves 37, 41 pass through condensing lens system 42, becoming beam halves 54, 55 which converge at pixel location 43. This pixel will therefore have a maximum holographic direction determined by the azimuthal locations on loci 47 and 48 from which these converging beam halves 54, 55 originate.

It is believed to be apparent that the locations on loci 47 and 48 at which beam halves 37, 41 arrive at the condensing lens system 42 can be changed at will by the simple expedient of appropriately adjusting the electronic control signals applied to X, Y galvanometers 17, 18. In turn, such changes will change the azimuthal directions from which beam halves 54 and 55 reach pixel location 43 and therefore also the maximum holographic direction of that pixel.

As for pixel coloration, it is also believed to be apparent that the radii of semi-circular loci 47 and 48 can also be changed at will, by appropriately adjusting the values of the electronic control signals applied to X, Y galvanometers 17, 18. In turn, such changes will change the included angle between beam halves 54 and 55 reaching pixel location 43, and thereby also the holographic coloration of that pixel.

Thus, the invention enables the complete control of both of these pixel parameters, using as the only non-stationary elements the low-inertia mirrors of the two X, Y galvanometers 17, 18.

That the inventive technique is much freer from the problem of high inertia than the prior art is believed to be self-evident, since galvanometers are inherently low inertia devices. However, this is also empirically confirmed. Using the prior art interferometer head, the production by the dot matrix techniques of a hologram with a surface area of, say, about 40×40 inches typically required at least about 72 hours. In striking contrast, such production using the inventive technique can be accomplished in as little as 3 hours: a 24 to 1 improvement in the speed of hologram production.

It will be understood that, during production of a hologram using the inventive technique, the workpiece is displaced relative to the optics, or vice versa, and the X, Y galvanometers are electrically controlled so that the desired holographic pixels are produced at locations determined by this relative displacement.

In order to prevent impairment of the holographic effect produced by the invention, it is desirable to prevent defocusing of the reunited beam halves due to small, unintended variations in the optimum distance between the condensing lens system 42 and the surface 44 on which the holographic pixels are to be formed through ablation by these beam halves. Such variations can stem from simple irregularities in the surface of the workpiece. Therefore, means are preferably provided to maintain that distance constant. This can consist of a "follower", (not shown) riding on the surface of the workpiece 20 and detecting any distance variation, plus means for moving the lens system 42 toward or away from the surface 44 in a compensating manner.

However, such distance compensating movement does not determine either the maximum holographic direction, or the coloration of the pixels. Therefore, the statement made previously in this application still applies, namely that the only non-stationary elements which determine those parameters are the low-inertia X, Y galvanometers 17, 18.

To form each pixel in accordance with the present invention, the material of workpiece 20 is ablated by means of the two interfering laser beam halves of sufficient power, impinging on that workpiece 20 at the desired pixel locations.

This laser beam ablation at different pixel locations is readily achieved by displacing the workpiece 20 in mutually orthogonal directions relative to the focal point 43 (FIGS. 2 and 3) e.g. by so moving the target positioner 21 (see FIG. 1). These movements are coordinated under the control of PC 10 and with control of the X, Y galvanometer with the illumination of the workpiece by laser 15, to produce the holographic pixels in the desired locations. Alternatively, the workpiece 20 can be cylindrical and rotated about the cylinder axis while moving it along that axis. In each case, what is needed is relative displacement of focal point 43 and workpiece 20. This relative displacement can alternatively be accomplished by appropriately moving the whole optics assembly shown in FIGS. 2 and 3. However, moving the workpiece 20 is preferred.

Figure 4:
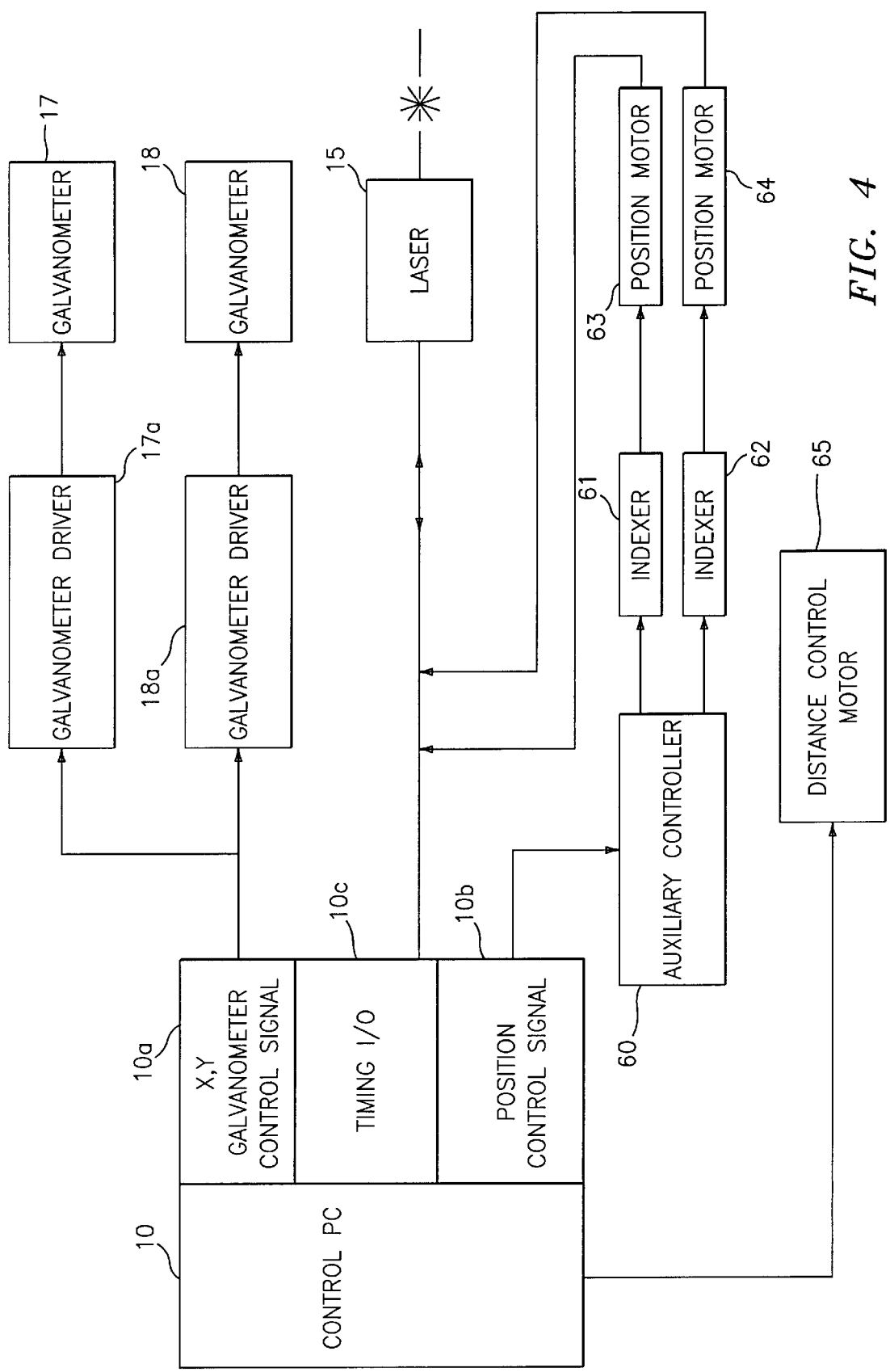
FIG. 4 is a block diagram of a preferred embodiment of the controls for the system of the invention.

Referring now to FIG. 4, this shows a more detailed block diagram of the preferred arrangement for the PC control of the X, Y galvanometers 17, 18, the laser 15, the workpiece positioner 21 and the condensing lens system 42. The PC 10 generates an X, Y galvanometer control signal, as shown by block 10a, which is transmitted to the galvanometer drivers 17a, 18a. The galvanometer drivers output the control signals for the desired X, Y beam deflections (FIG. 3). The PC 10 also generates a workpiece positioner control signal, as shown by block 10b, for the positioner 21 (FIG. 1) to place the workpiece 20 such that the focal point 43 (FIG. 3) for a given pixel is in the desired location. This can be done utilizing a separate motion control card in the PC 10 or via a driver program. This signal is transmitted to an auxiliary controller 60 which drives two indexers 61, 62 for the mutually perpendicular motion control of the workpiece positioner 21. The indexers 61, 62 drive two positioning motors 63, 64, respectively. The position signals for motors 63, 64 are also used to activate the laser 15 when these motors are stopped with the workpiece at a desired pixel location, as determined by the timing input/output signal in block 10c.

The previously mentioned control of distance between the condensing lens 42 and the workpiece 20 is also preferably provided by the PC 10. This controls a motor 65 to move the position of the condensing lens 42 in the direction toward or away from the workpiece 20, as appropriate. It should be noted that control of this distance may also be accomplished by manual adjustment when the distance from the condensing lens 42 to the workpiece remains constant, such as when the workpiece, or series of workpieces, are small flat sheets upon which holograms are to be formed. In that case the motor 65 could be omitted.

It will be understood that numerous changes may be made in the implementation of the inventive technique, without departing from its basic concepts.

For example, in place of the X, Y galvanometers 17, 18 there may be used other low-inertia two-axis beam deflectors.

Figure 5:
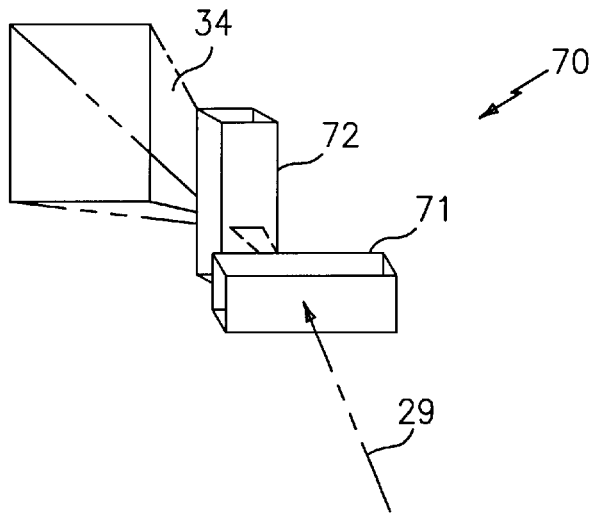
FIG. 5 is an isometric view of a second embodiment of a two-axis beam deflecting means usable in the system of the present invention.

FIG. 5, to which reference may now be made, shows another embodiment of such a beam deflector designated by reference numeral 70. Two such deflectors 70 are provided in accordance with the invention. One is used in place of galvanometer 17 and the other is used in place of galvanometer 18 for controllably deflecting the beam halves 29 and 31 onto the collimating lenses 35, 39. These beam deflectors 70 comprise acousto-optic crystals 71, 72 in an X-Y configuration, which deflect the beam halves arriving along paths 29 and 31, respectively, in the same manner as galvanometers 17, 18 in response to control signals from PC 10. Such deflectors 70 are available from NEOS Technologies Inc. of Melbourne, Fla. 32904.

Figure 6:
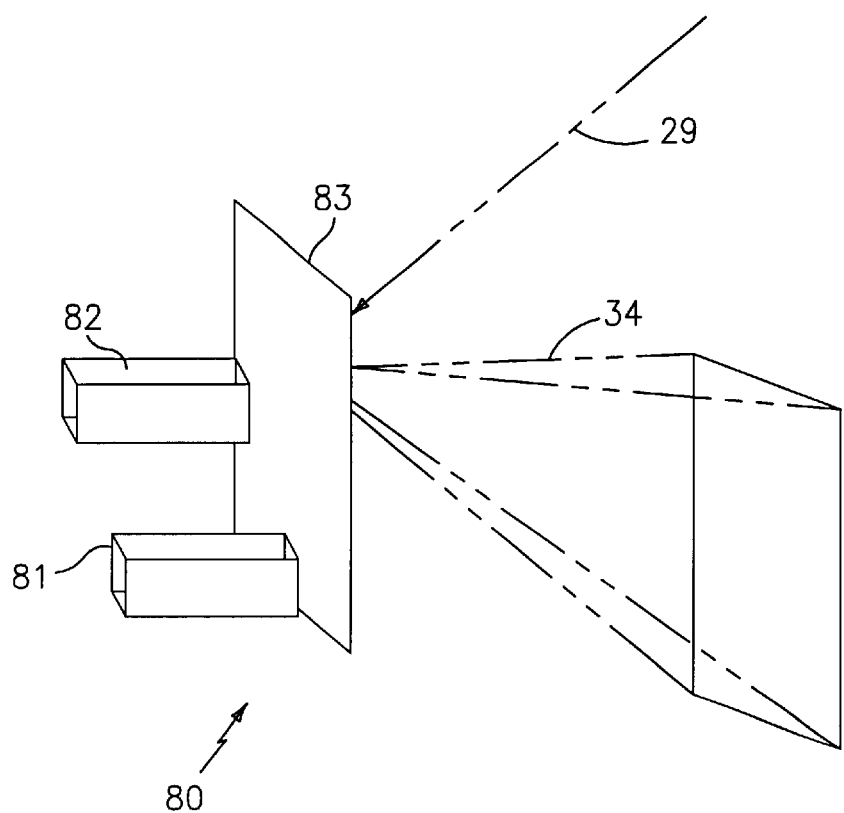
FIG. 6 is an isometric view of a third embodiment of a two-axis beam deflecting means usable in the system of the present invention.

Still another embodiment of a suitable two-axis beam deflector is shown in FIG. 6, designated by reference numeral 80. Two such beam deflectors 80 are provided. One is used in place of galvanometer 17 and the other in place of galvanometer 18 for controllably deflecting beam halves 29 and 31 onto the collimating lenses 35, 39, respectively. These beam deflectors 80 comprise two piezo-electronic transducers 81, 82, which are used to tilt a mirror 83 in two mutually perpendicular directions. These piezo-electronic transducers are controlled by the PC 10 so as to properly position the mirror 83. Such deflectors 80 are available from Kinetic Ceramics, Inc. Hayward, Calif. 94595.

Figure 8A:
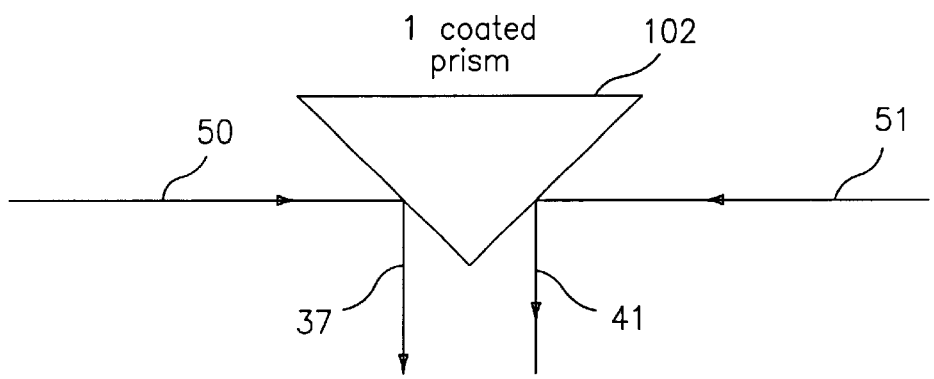
FIGS. 8A–8C show alternate embodiments of the prism for redirecting a light beam.
Figure 8B:
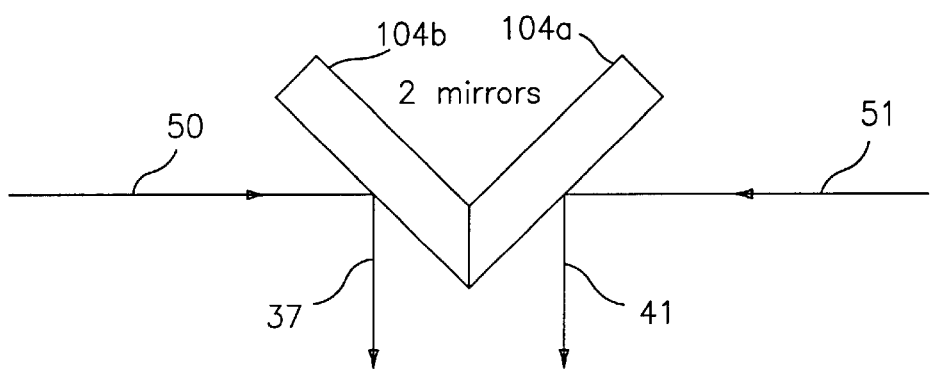
Figure 8C:
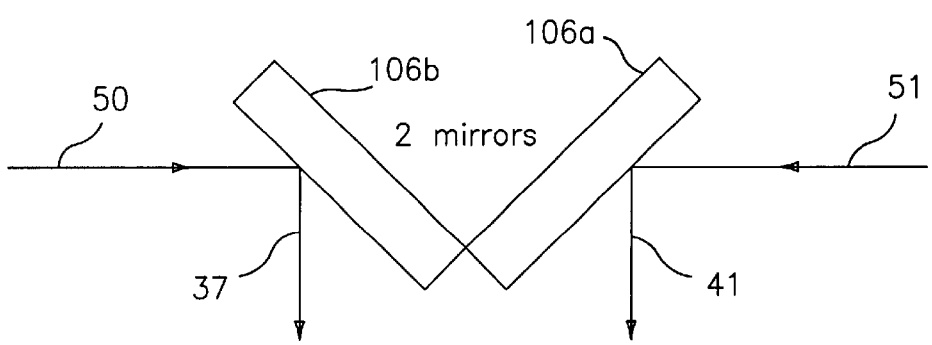

Still other possible modifications involve replacing prisms 36 and 40 with a single prism (at 102 in FIG. 8A) having a reflective coating on its outer surface, or with face coated mirrors (at 104a 104b in FIG. 8B and 106a, 106b in 8C), or with other types of reflectors to achieve the 90° redirection of the two mirror image beam halves 50, 51 which has been previously described. Also, galvanometers 17, 18 could be placed at different locations, such as at the locations of mirrors 28 and 30, provided that the beam halves continue to be deflected and recombined to form the required interference pattern at the pixel location 43.

As previously explained, by controlling both of the beam deflecting means, such as X, Y galvanometers 17, 18 by the same signal, the beam halves 54, 55 which are reunited at the pixel locations will arrive there from diametrically opposite orientations. However, it is also possible to use control signals which are different from each other at the beam deflecting means. This will cause the reuniting beam halves 54, 55 to arrive from orientations which are no longer diametrically opposite to each other. Of course, the resulting maximum holographic directions of a given pixel will still be at orientations which bisect the angles between the orientations of the reuniting beam halves 54, 55.

Figure 10A:
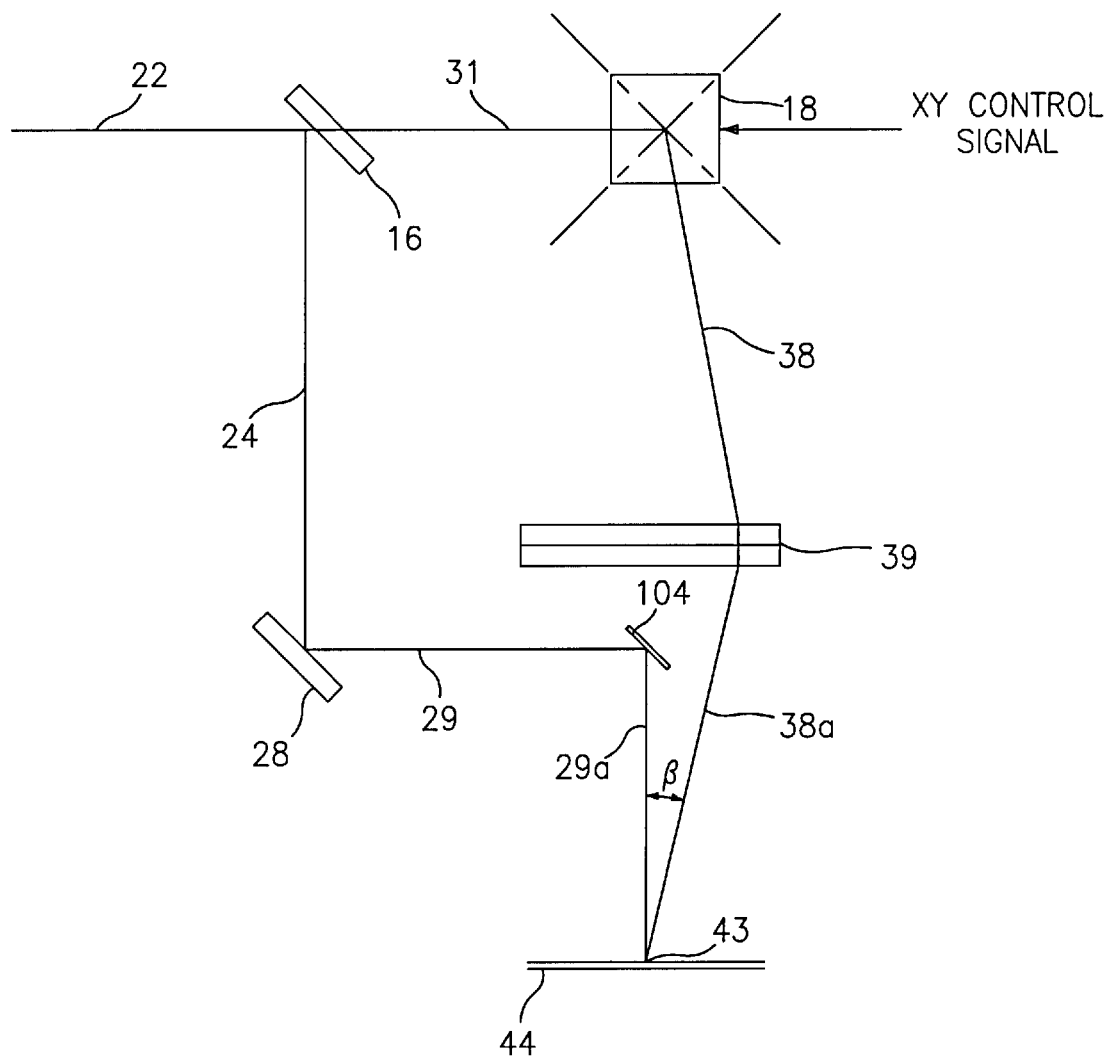
FIG. 10A is first schematic representation of the optical apparatus having a single galvanometer.

Referring to FIG. 10A, the arrangement of the optical components of the present invention may comprise one galvanometer 18 receptive of a first split laser beam 31 which is redirected as output beam 38. The output beam 38 is in turn focused by the focusing lens set 39 to the pixel location 43 on the workpiece 44. A second split laser beam 24 is redirected via mirrors 28 and 104 to the workpiece 44 to combine with the focused beam 38a at the pixel location 43 at a prescribed azimuthal direction, α and included angle, β.

Figure 10B:
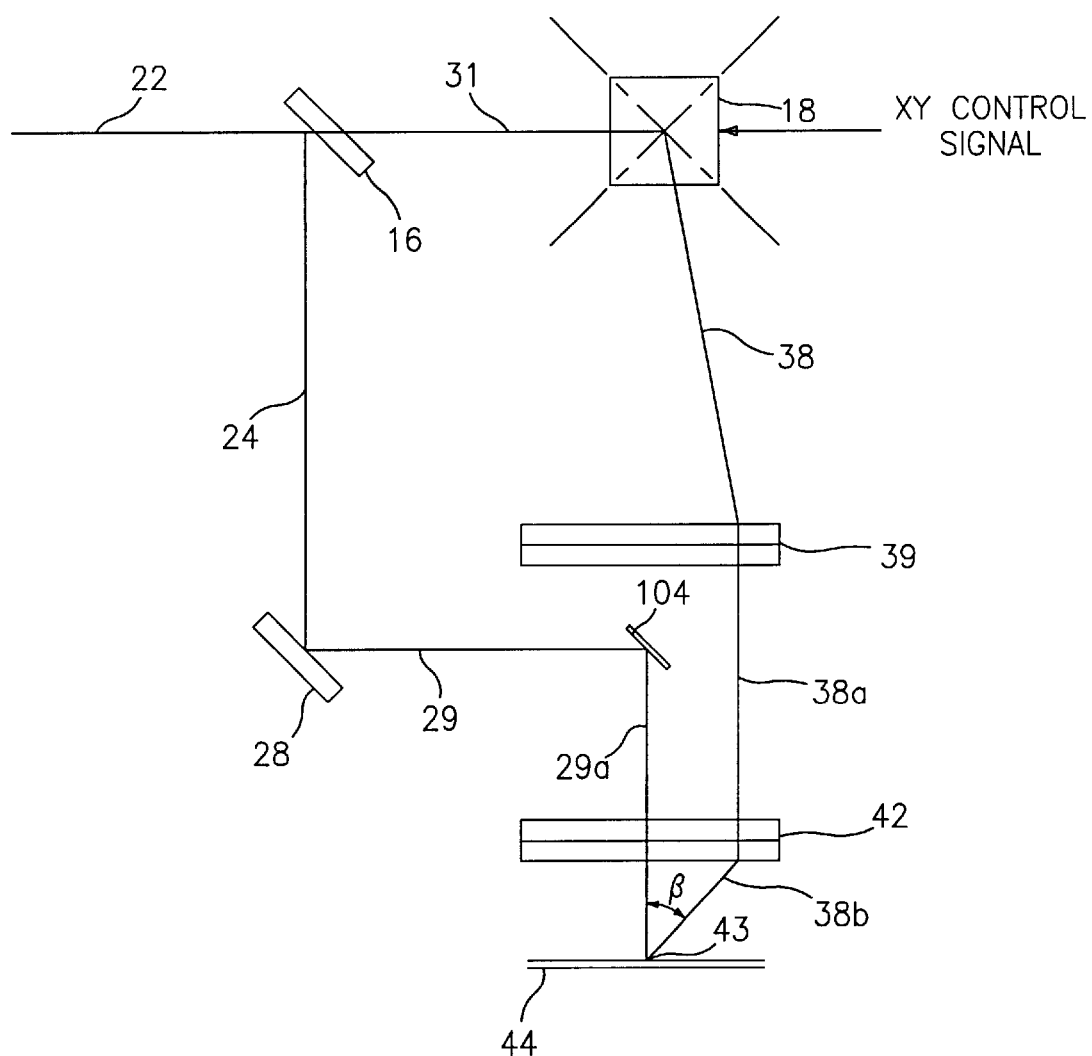
FIG. 10B is second schematic representation of the optical apparatus having a single galvanometer.

Referring to FIG. 10B, the arrangement of the optical components of the present invention may comprise one galvanometer 18 receptive of a first split laser beam 31 which is redirected as output beam 38. The output beam 38 directed to collimating lens set 39 where upon it exits as collimated beam 38a. Collimated beam 38a is in turn focused by the focusing lens set 42 to the pixel location 43 on the workpiece 44. A second split laser beam 24 is redirected via mirrors 28 and 104 to the workpiece 44 to combine with the focused beam 38b at the pixel location 43 at a prescribed azimuthal direction, α and included angle β.

Figure 11:
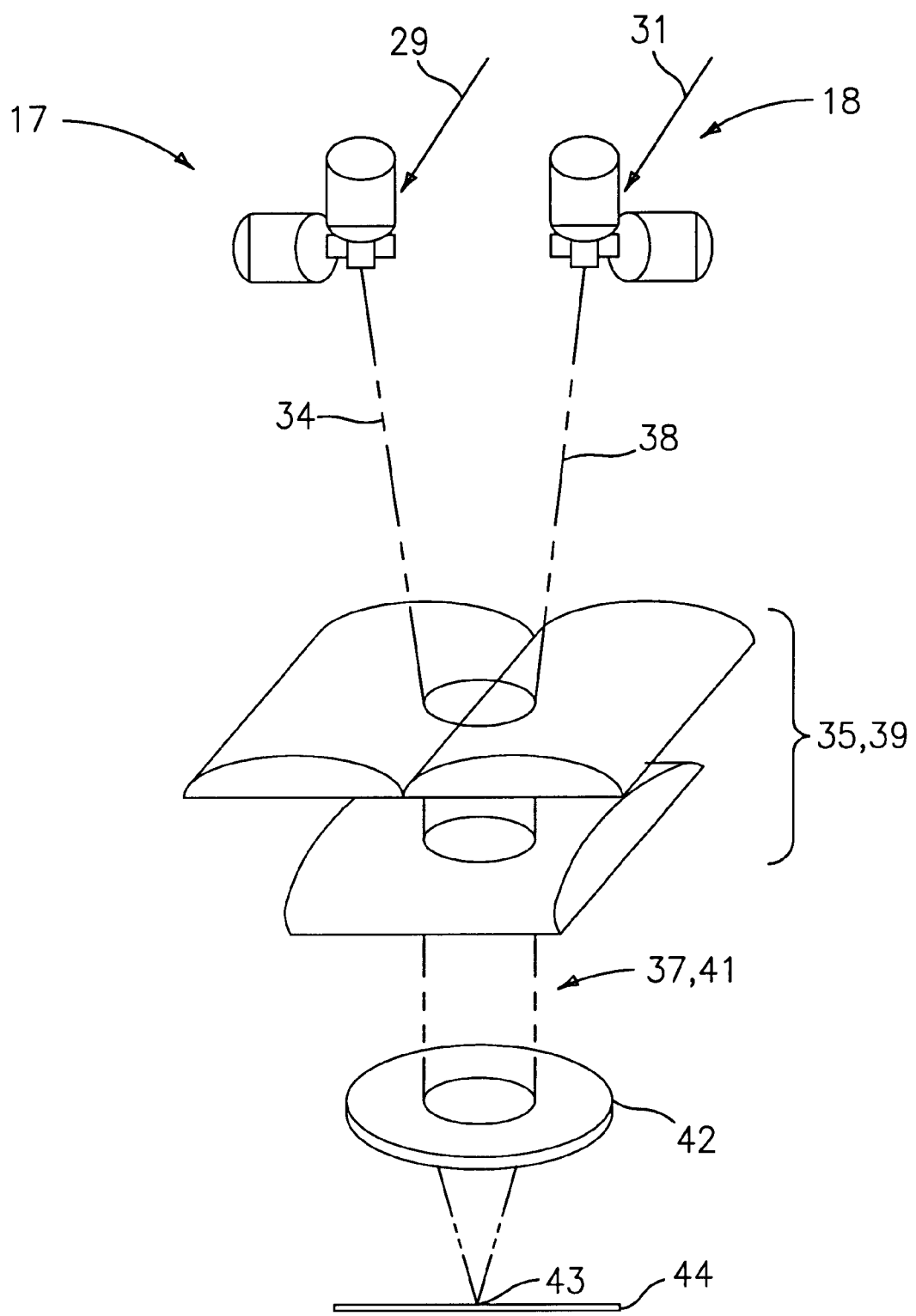
FIG. 11 is schematic representation of the optical apparatus wherein the output laser beams from the galvanometers are guided directly to the workpiece through a collimating lens set.

Referring to FIG. 11, the arrangement of the optical components of the present invention may comprise the galvanometers 17, 18 receptive of the first and second split laser beams 29, 31 which are redirected as output beams 34, 38 to the collimating lens set 35, 39. The collimating lens set 35, 39 collimates the beams 34, 38 as in FIGS. 3 and 9 and provides as output the collimated beam 37, 41 directed to the focusing lens set 42 whereupon the beams 37, 41 are focused to the pixel location 43 at a prescribed azimuthal direction, α and included angle β.

Figure 7:
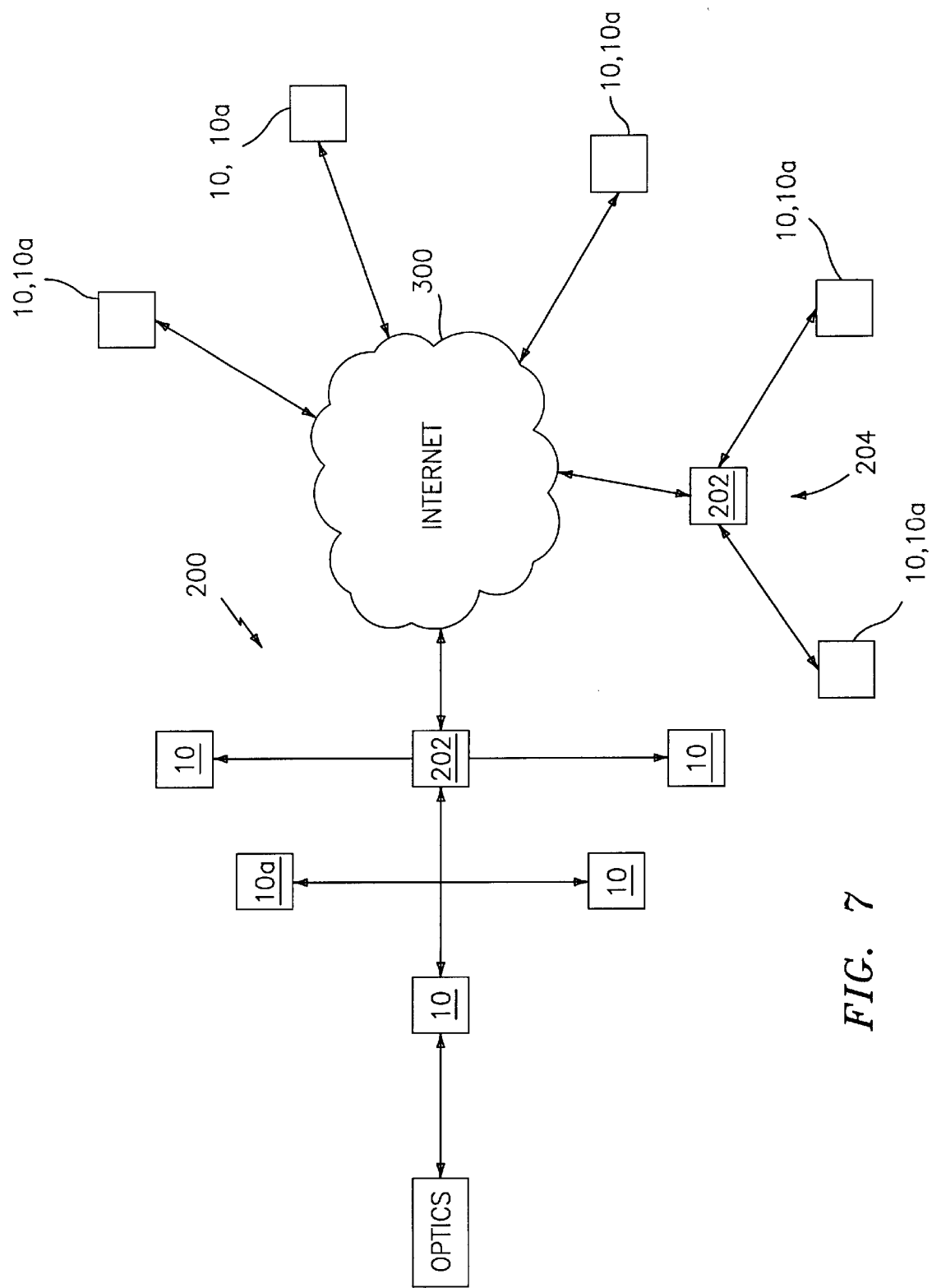
FIG. 7 is a schematic representation of the system embodying the present invention connected to a distributed computer or communications network.

Referring to FIG. 1, the local PC 10 is shown having an on-line connection 13. As seen in FIG. 7, the on-line connection 13 provides a connection to a distributed computer or communications network 200, such as a local area network (LAN) or a wide area network (WAN), a global network (e.g. the Internet) or an intranet.

The computer network 200 includes at least one other similar client personal computer 10 connected to a server 202 from remote geographical locations by wired or wireless connections, by radio based communications, by telephony based communications, or by other network-based communications. The computer 10 may also be connected directly to other like computers 10 or to a display device 10a. The computer network 200 is in turn similarly connected to other computers 10, display devices 10a or networks 204 through the Internet 300. The computers 10, display devices 10a and other electronic media devices of the networks 200, 204, 300 may be configured to execute program software, that allows them to send, receive, record, store and process commands or algorithms between and amongst themselves via the networks 200, 204 and the Internet 300 to make holograms or ablate a workpiece. Such processing of the commands or algorithms includes, for example, various types of image compression and decompression algorithms, as well as other types of filtering, contrast enhancement, image sharpening, noise removal and correlation for image classification. Decompressed images may be displayed on display devices such as liquid crystal displays, liquid crystal TVs or electrically or optically addressable spatial light modulators.

This invention has applications in document security and pattern recognition as well as in the serial multidimensional imaging of moving objects, such as in multidimensional TV, video and movies as well as multidimensional display and multidimensional visualization and other similar applications. Thus, serial images may be formed of moving objects by forming a series of original holograms of the moving objects, compressing the series of original holograms of the moving objects to form a series of compressed holograms, decompressing the series of compressed holograms to form a series of decompressed holograms; and reconstructing the moving objects from the series of decompressed holograms to form a series of multidimensional images of the moving objects.

As described above, the present invention can be embodied in the form of computer-implemented processes and apparatuses for practicing those processes. The present invention can also be embodied in the form of computer program code containing instructions embodiment in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Still other modifications could be made by those skilled in the art without departing from the present inventive concept. It is understood, therefore, that the invention is not limited to the particular embodiment disclosed, but is intended to cover modifications within the spirit and scope of the present invention.

What is claimed is:

1. A system for ablating a workpiece with a laser beam to produce holographic pixels with controllable maximum holographic directions and colorations, said system including:
a plurality of system components which collectively determine said maximum holographic directions and colorations,
only two of said components having properties which are controllable to vary said directions or colorations for different pixels wherein said only two components are a pair of low-inertia, two-axis beam deflecting means.

2. The system of claim 1, wherein said components other than said only two components do not have properties which are controllable to vary said directions or colorations for different pixels.

3. The system of claim 1, wherein said only two components are a pair of two axis galvanometers having mirrors which are moveable to controllably deflect said laser beam.

4. The system of claim 3, wherein means are provided to produce electronic control signals which, when applied to said galvanometers, controllably move their mirrors to deflect said laser beam.

5. The system of claim 1, further comprising means for dividing said laser beam into halves and utilizing said beam deflecting means to direct said halves toward each other from opposite directions and means for electronically controlling said deflecting means to deflect said opposite direction beam halves.

6. The system of claim 5, further comprising means for reuniting said beam halves after having been directed toward each other by said beam deflecting means.

7. The system of claim 6, wherein said reuniting means include means for causing said directed beam halves to follow parallel paths; and
means for causing said parallel beam halves to converge at the pixel locations.

8. The system of claim 7, wherein said paralleling means is constructed and arranged to parallel said beam halves after they have been directed by such deflecting means.

9. The system of claim 8, comprising means for redirecting said oppositely directed beam halves towards said converging means.

10. The system of claim 9, wherein said redirecting means is constructed and arranged to preserve the azimuthal relationship and spacing between said deflected and paralleled beam halves.

11. The system of claim 10, wherein said paralleling means includes a collimating lens means in each path followed by the beam half from the respective deflecting means; and
said redirecting means include means for turning each said collimated beam half by 90° and into the same direction.

12. A system for forming interference patterns on the surface of a workpiece through laser ablation of the surface, the system comprising:
a laser generating a laser beam;
means for dividing the beam from said laser into separate halves; and
means for guiding said halves along different paths toward said surface;
said guiding means including beam half deflecting means stationed at predetermined locations along each path, including low-inertia means for controllably deflecting said guided beam halves in directions deviating from said different paths;
wherein said low inertia means is at least one of a two axis galvanometer, a two axis piezoelectric beam deflector and a two axis acousto-optic beam deflector.

13. The system of claim 12 wherein said directions, deviating from said paths, are mutually perpendicular.

14. The system of claim 12 wherein said separate beam halves are reunited at said surface arriving from different azimuthal orientations relative to said surface.

15. The system of claim 14 wherein said guiding means are constructed and arranged to determine the directions from which the separate beam halves deflect ed by said guiding means arrive at said surface.

16. The system of claim 14 further comprising second low inertia means including a two axis galvanometer for controllably deflecting the other guided beam half from its said path.

17. The system of claim 16 wherein said controllable deflecting means are so constructed and arranged that they respond to equal control signals to deflect their respective guided beam portions by essentially the same amounts in mutually perpendicular directions, respectively.

18. The system of claim 16 further comprising means for directing said controllably deflected beam portions to reunite at said surface arriving from said different azimuthal orientations, respectively.

19. The system of claim 16 wherein said second low-inertia means is also a two-axis galvanometer.

20. A system for ablating holographic pixels on the surface of a workpiece, the system comprising:
a laser generating a laser beam;
a beam splitter dividing the laser beam into a first beam and a second beam;
a controller providing as output at least one control signal; and
a pair of low-inertia, two-axis beam deflectors receptive of the first and second laser beams guiding the first and second laser beams along different paths to a prescribed pixel location on the surface of the workpiece, thereby combining the first and second laser beams at a prescribed azimuthal direction and included angle;
wherein at least one of the beam deflectors includes a beam deflector receptive of the at least one control signal thereby controllably deflecting at least one of the first laser beam and the second laser beams to the prescribed pixel location.

21. The system as set forth in claim 20 wherein the laser comprises a Nd:YAG laser.

22. The system as set forth in claim 20 wherein the at least one beam deflector receptive of the at least one control signal comprises a plurality of mirrors controllably positioned to deflect the first laser beam or the second laser beam in a prescribed coordinate system.

23. The system as set forth in claim 20 further comprising a collimator for collimating at least one of the first laser beam and the second laser beams.

24. The system as set forth in claim 20 further comprising a focusing element for focusing at least one of the first laser beam and the second laser beam to the prescribed pixel location.

25. The system as set forth in claim 20 wherein the controller is connected to a distributed network.

26. The system as set forth in claim 25 wherein the distributed network comprises:
interconnected network servers or routers located remote from the controller; and
a plurality of electronic media devices in communication with the servers and routers.

27. A system for forming interference patterns on the surface of a workpiece, the system comprising:

a laser generating a laser beam;

a beam splitter splitting the laser beam into a first laser beam and a second laser beam;

a controller providing as output at least one control signal; and a pair of low-inertia, two-axis beam deflectors receptive of the first and second laser beams guiding the first and second laser beams along different paths to a prescribed pixel location on the surface of the workpiece, thereby combining the first and second laser beams at a prescribed azimuthal direction and included angle;

wherein at least one of the beam deflectors includes a beam deflector receptive of the at least one control signal thereby controllably deflecting at least one of the first and second laser beams to the prescribed pixel location.

28. The system as set forth in claim 27 wherein the laser comprises a Nd:YAG laser.

29. The system as set forth in claim 27 wherein the at least one beam deflector receptive of the control signal comprises a plurality of mirrors controllably positioned to deflect the first laser beam or the second laser beam in a prescribed coordinate system.

30. The system as set forth in claim 27 further comprising a collimator for collimating at least one of the first laser beam and the second laser beams.

31. The system as set forth in claim 27 further comprising a focusing lens for focusing the first laser beam and the second laser beam to the prescribed pixel location.

32. The system as set forth in claim 27 wherein the controller is connected to a distributed network.

33. The system as set forth in claim 32 wherein the distributed network comprises:

interconnected network servers or routers located remote from the controller; and a plurality of electronic media devices in communication with the servers and routers.

34. A method of ablating a workpiece, the method comprising:

generating a laser beam;

dividing the laser beam into a first beam and a second beam; and controllably guiding the first and second laser beams along different paths to a prescribed pixel location on the surface of the workpiece by rotating about two axes a pair of beam deflectors receptive of the first and second laser beams, thereby combining the first and second laser beams at a prescribed azimuthal direction and included angle.

35. A method of forming interference patterns on the surface of a workpiece, the method comprising:

generating a laser beam;

dividing the laser beam into a first beam and a second beam; and controllably guiding the first and second laser beams along different paths to a prescribed pixel location on the surface of the workpiece by rotating about two axes a pair of beam deflectors receptive of the first and second laser beams, thereby combining the first and second laser beams at a prescribed azimuthal direction and included angle.

36. A storage medium encoded with machine-readable computer program code, the computer program code including instructions for causing an electro-optic system to implement a method of forming interference patterns on the surface of a workpiece, the method comprising:

generating a laser beam;

dividing the laser beam into a first beam and a second beam; and controllably guiding the first and second laser beams along different paths to a prescribed pixel location on the surface of the workpiece by rotating about two axes a pair of beam deflectors receptive of the first and second laser beams, thereby combining the first and second laser beams at a prescribed azimuthal direction and included angle.

37. The system as set forth in claim 28 wherein the collimator comprises first and second cylindrical lenses positioned at right angles with respect to one another.

38. The system as set forth in claim 30 wherein the collimator comprises first and second cylindrical lenses positioned at right angles with respect to one another.

* * * * *